(12) United States Patent
Luthra

(10) Patent No.: US 11,066,339 B2
(45) Date of Patent: Jul. 20, 2021

(54) ARTICLE FOR HIGH TEMPERATURE SERVICE

(71) Applicant: General Electric Company, Schenectady, NY (US)

(72) Inventor: Krishan Lal Luthra, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 135 days.

(21) Appl. No.: 15/988,188

(22) Filed: May 24, 2018

(65) Prior Publication Data

US 2018/0354866 A1 Dec. 13, 2018

Related U.S. Application Data

(60) Provisional application No. 62/516,742, filed on Jun. 8, 2017.

(51) Int. Cl.
| | | |
|---|---|---|
| *C04B 41/89* | (2006.01) | |
| *C04B 41/00* | (2006.01) | |
| *C04B 41/50* | (2006.01) | |
| *C04B 35/78* | (2006.01) | |

(Continued)

(52) U.S. Cl.
CPC .............. *C04B 41/89* (2013.01); *C04B 35/78* (2013.01); *C04B 41/009* (2013.01); *C04B 41/5024* (2013.01); *C04B 41/5025* (2013.01); *C04B 41/5059* (2013.01); *C04B 41/5066* (2013.01); *C04B 41/5071* (2013.01);

(Continued)

(58) Field of Classification Search
CPC ..... C04B 41/52; C04B 41/522; C04B 41/524; C04B 41/89; C04B 41/5062; C04B 41/5071; C04B 35/58085; C04B 35/58092; C04B 41/5096; F01D 5/28; F01D 5/288; F05D 2230/2261; F05D 2230/611; F05D 2230/6111; C23C 4/10; C23C 4/0682; C23C 4/14–185; C23C 16/42

See application file for complete search history.

(56) References Cited

U.S. PATENT DOCUMENTS

| | | |
|---|---|---|
| 3,993,602 A | 11/1976 | Prochazka |
| 4,619,697 A | 10/1986 | Hijkata |
| 5,474,619 A | 12/1995 | Kreider |

(Continued)

FOREIGN PATENT DOCUMENTS

| | | |
|---|---|---|
| JP | H05229886 A | 9/1993 |
| JP | H0769763 A | 3/1995 |

(Continued)

OTHER PUBLICATIONS

Stolin et al., Silicide Ceramic Synthesis Based on Molybdenum Disilicide in a Combustion Regime Under High-Temperature Deformation Conditions, Refractories and Industrial Ceramics, vol. 56, No. 3, Sep. 2015, p. 304-309.

*Primary Examiner* — Z. Jim Yang
(74) *Attorney, Agent, or Firm* — Dority & Manning, P.A.

(57) ABSTRACT

An article comprises a substrate comprising a ceramic matrix composite; a first layer disposed over the substrate, the first layer comprising a substantially interconnected silicon source material, and a secondary material; and a second layer disposed over the first layer, the second layer comprising a membrane material in mass transfer communication with the silicon source material.

35 Claims, 1 Drawing Sheet

(51) Int. Cl.
*F01D 5/28* (2006.01)
*C04B 41/52* (2006.01)

(52) U.S. Cl.
CPC ...... *C04B 41/5089* (2013.01); *C04B 41/5096* (2013.01); *F01D 5/288* (2013.01); *C04B 41/52* (2013.01)

(56) References Cited

U.S. PATENT DOCUMENTS

| | | | |
|---|---|---|---|
| 5,660,885 A | 8/1997 | Hasz et al. | |
| 6,296,941 B1 | 10/2001 | Eaton, Jr. et al. | |
| 6,410,114 B1 | 6/2002 | Eaton, Jr. et al. | |
| 6,589,898 B1 | 7/2003 | Gnesin et al. | |
| 6,617,036 B2 | 9/2003 | Eaton et al. | |
| 6,770,856 B2 | 8/2004 | Gnesin et al. | |
| 7,226,672 B2 | 6/2007 | Litton et al. | |
| 7,354,651 B2 | 4/2008 | Hazel et al. | |
| 7,549,840 B2 | 6/2009 | Subramanian et al. | |
| 7,740,960 B1 | 6/2010 | Zhu et al. | |
| 8,119,247 B2 | 2/2012 | Kirby et al. | |
| 8,470,460 B2 | 6/2013 | Lee | |
| 8,501,840 B2 | 8/2013 | Kirby et al. | |
| 8,673,400 B2 | 3/2014 | Kirby et al. | |
| 10,604,454 B1* | 3/2020 | Zhu | C04B 41/5042 |
| 10,807,912 B1* | 10/2020 | Zhu | F01D 5/284 |
| 2003/0106888 A1 | 6/2003 | Gnesin et al. | |
| 2003/0180518 A1 | 9/2003 | Rogowski et al. | |
| 2004/0219295 A1* | 11/2004 | Perepezko | F01D 5/288 427/255.27 |
| 2004/0234740 A1* | 11/2004 | Ojard | F01D 5/288 428/292.1 |
| 2004/0234783 A1* | 11/2004 | Eaton | C04B 41/5037 428/446 |
| 2004/0234784 A1* | 11/2004 | Eaton | C04B 41/009 428/446 |
| 2005/0003212 A1* | 1/2005 | Sun | C23C 28/324 428/446 |
| 2008/0124479 A1 | 5/2008 | Hazel et al. | |
| 2009/0162533 A1 | 6/2009 | Kirby et al. | |
| 2009/0178413 A1* | 7/2009 | Lee | C04B 41/89 60/752 |
| 2009/0246500 A1 | 10/2009 | Morra et al. | |
| 2010/0129673 A1* | 5/2010 | Lee | C09D 7/61 428/450 |
| 2010/0154422 A1 | 6/2010 | Kirby et al. | |
| 2010/0189911 A1 | 7/2010 | Berczik et al. | |
| 2010/0255260 A1* | 10/2010 | Lee | C04B 41/52 428/164 |
| 2010/0255289 A1* | 10/2010 | Lewinsohn | C04B 41/52 428/325 |
| 2013/0136915 A1 | 5/2013 | Naik | |
| 2013/0344319 A1* | 12/2013 | Zhu | C04B 41/5044 428/335 |
| 2014/0072816 A1* | 3/2014 | Lee | C04B 41/009 428/448 |
| 2014/0141219 A1 | 5/2014 | Kirby et al. | |
| 2014/0272197 A1 | 9/2014 | Lee | |
| 2014/0272344 A1 | 9/2014 | Wan | |
| 2016/0003063 A1* | 1/2016 | Rosenzweig | F01D 5/225 427/397.7 |
| 2016/0017749 A1* | 1/2016 | Luthra | F01D 5/282 428/333 |
| 2016/0024962 A1* | 1/2016 | Luthra | C04B 41/5024 428/312.6 |
| 2016/0273088 A1* | 9/2016 | Cybulsky | C04B 41/009 |
| 2016/0305004 A1* | 10/2016 | Olson | F01D 25/005 |
| 2017/0101348 A1* | 4/2017 | Wan | C04B 41/5006 |
| 2017/0218506 A1* | 8/2017 | Lee | C23C 4/134 |
| 2017/0218779 A1* | 8/2017 | Luthra | C04B 41/5035 |
| 2018/0037515 A1* | 2/2018 | Matsumoto | F01D 5/284 |
| 2018/0202300 A1* | 7/2018 | Landwehr | C04B 35/62855 |
| 2018/0282851 A1* | 10/2018 | Ndamka | C23C 4/134 |
| 2018/0311934 A1* | 11/2018 | Shoemaker | B32B 3/30 |

FOREIGN PATENT DOCUMENTS

| | | |
|---|---|---|
| JP | 2000/095559 A | 4/2000 |
| JP | 2006/027986 A | 2/2006 |
| JP | 2007/039306 A | 2/2007 |
| JP | 2009/149489 A | 7/2009 |
| JP | 2012/512807 A | 6/2012 |
| WO | WO2016/032789 A1 | 3/2016 |

* cited by examiner

ARTICLE FOR HIGH TEMPERATURE SERVICE

CROSS REFERENCE TO RELATED APPLICATIONS

This application claims priority to U.S. provisional application Ser. No. 62/516,742 filed Jun. 8, 2017, hereby incorporated by reference in its entirety.

BACKGROUND

This disclosure generally relates to materials and articles for service in high-temperature applications such as, for example, turbomachinery. More specifically, this disclosure relates to articles that include ceramic matrix composites and associated protective coatings, and methods for making these articles.

Ceramic matrix composite (CMC) materials offer the potential for higher operating temperatures than do metal alloy materials due to the inherent high-temperature material properties of ceramic materials. In applications such as gas turbine assemblies, this capability may be translated into a reduced cooling requirement which, in turn, may result in higher power, greater efficiency, and/or reduced emissions from the machine. However, CMC materials that include significant amounts of silicon-bearing materials, such as silicon carbide, are susceptible to attack and rapid recession by water vapor at elevated service temperatures. Environmental barrier coatings (EBC) have been developed to inhibit this degradation mechanism.

EBCs applied to silicon-bearing materials, for example, are designed to be relatively stable chemically in high-temperature, water vapor-containing environments. One illustrative conventional EBC system, as described in U.S. Pat. No. 6,410,148, comprises a silicon or silica bond layer (also referred to herein as a "bondcoat") applied to a silicon-bearing substrate; an intermediate layer comprising mullite or a mullite-alkaline earth aluminosilicate mixture deposited over the bond layer; and a top layer comprising an alkaline earth aluminosilicate deposited over the intermediate layer. In another example, U.S. Pat. No. 6,296,941, the top layer is an yttrium silicate layer rather than an aluminosilicate.

The above coating systems can provide suitable protection for articles in demanding environments, but opportunities for improvement in coating performance exist. For instance, the presence of large amounts of uncontained free silicon in the bond layer may restrict the maximum rated material temperature for a coated component to avoid melting of the silicon and resultant mechanical instability of the bond layer. Improvements in the quality of engineered structural materials, such as silicon—bearing ceramics and ceramic matrix composites, have enhanced the high temperature capability of these materials to the point where the melting point of the silicon in the EBC bond layer has become a limiting factor for the use of such materials in high-temperature structural applications.

Therefore, there remains a need in the art for EBC bond layers with temperature capability that exceeds that of conventional bond layers. There is also a need for machine components employing coating systems that incorporate an improved bond layer to enhance their high-temperature capability.

DRAWINGS

Various features, aspects, and advantages of the present invention will become better understood when the following detailed description is read with reference to the accompanying drawing in which like characters represent like parts, wherein.

DETAILED DESCRIPTION

Figure 1:
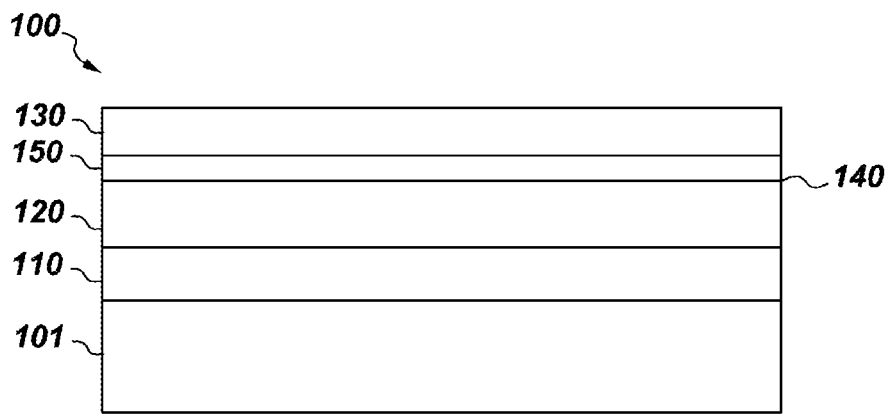
FIG. 1 is a cross-section illustration of one embodiment of the present invention.

Approximating language, as used herein, may be applied to modify any quantitative representation that could permissibly vary without resulting in a change in the basic function to which it is related. Accordingly, a value modified by a term or terms, such as "about", and "substantially" is not to be limited to the precise value specified. In some instances, the approximating language may correspond to the precision of an instrument for measuring the value. Here and throughout, range limitations may be combined and/or interchanged; such ranges are identified and include all the sub-ranges contained therein unless context or language indicates otherwise.

Throughout the following, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

The techniques described herein address the temperature limitations described above for conventional silicon bondcoats in part through the application of materials that have substantially higher melting temperatures than elemental silicon, but possess the ability to form a protective silica layer in the presence of an oxidative environment in a similar manner to conventional silicon bondcoats. Silicides are one example of such materials; however, silicides tend to have significantly higher coefficient of thermal expansion than substrate materials of interest, such as silicon carbide, silicon nitride, and CMC's based on one or more of these. This mismatch in thermal expansion coefficients may lead to spallation of silicide coatings due to high thermal stresses. Reducing the thickness of the silicide will reduce the thermal stress to some degree, but such a reduction reduces the amount of material available to protect the substrate, leading to unacceptable service life if the silicide is consumed due to oxidation over time.

Silicon carbide and silicon nitride are other examples of silicon-bearing materials that form silica under high temperature, oxidative conditions. However, silicon nitride has a significantly lower coefficient of thermal expansion than substrate materials of interest, such as silicon carbide/silicon carbide composites. Moreover, silicon carbide and silicon nitride form carbon-and-oxygen-bearing gas and nitrogen, respectively, during oxidation, and these gas by-products can disrupt the integrity of coatings over long times.

Embodiments of the present invention are designed to deal with the oxidation issue through the application of appropriately selected materials, using a coating architecture that mitigates thermal expansion mismatch and gaseous by-product formation, while maintaining excellent high temperature oxidation resistance.

Referring to FIG. 1, one embodiment is an article 100 comprising a substrate 101, a first layer 110 disposed over substrate 101, and a second layer 120 disposed over first layer 110. In some embodiments, one or more top layer 130 is disposed over second layer 120. Very generally speaking, and as explained in greater detail below, in service under high-temperature, oxidative conditions, silicon is provided in substantial part from the material constituents of first layer 110, diffuses through second layer 120 to the surface 140 of second layer 120, and there reacts with oxidative species from the environment to form a protective layer of oxide 150. This layer of oxide 150 is typically rich in silica and is often referred to in the art as a "thermally grown oxide" or "TGO."

Substrate 101 may be made from any suitable material, such as a ceramic or an intermetallic material. The substrate, in one embodiment, includes a ceramic, for example an oxide, nitride, or carbide. In a particular embodiment, substrate 101 includes a material that comprises silicon, such as silicon nitride, or silicon carbide. This material, in some embodiments, includes a ceramic-matrix composite (CMC) material, such as a material made of a matrix phase and a reinforcement phase. The matrix phase, the reinforcement phase, or both of these phases includes, in certain embodiments, a silicon-bearing ceramic, such as silicon carbide (SiC) or silicon nitride. In some embodiments, both the reinforcement phase and the matrix phase comprise silicon carbide, thus the nomenclature "SiC/SiC composite." In one embodiment, the article 100 is a component for a gas turbine assembly, such as, for example, a combustion liner, transition piece, shroud, vane, or blade.

First layer 110 includes at least two materials: a silicon source material, and a secondary material. The secondary material generally is chemically compatible with the silicon source material, meaning that it does not chemically react, or otherwise interact, with the silicon source material in a way that substantially alters the quantity of silicon available to be provided by first layer 110 to participate in TGO formation as described previously. The secondary material generally serves as a support or scaffold, holding the silicon source material that is disposed in first layer 110, and further may maintain the average thermal expansion coefficient of first layer 110 at an acceptable level to manage thermal stresses with article 100. In some embodiments, the coefficient of thermal expansion of the secondary material is less than about $6 \times 10^{-6}$/degree Celsius. For instance, where the silicon source material has a higher coefficient of thermal expansion than the substrate 101, the secondary material includes material having a lower coefficient of thermal expansion than the silicon source material, and in particular embodiments has a coefficient of thermal expansion less than or equal to that of silicon carbide. Including this low-expansion material as the secondary material in first layer 110 reduces the effective thermal expansion coefficient of the layer 110 and mitigates thermal stresses that would otherwise arise through the presence of higher thermal expansion materials, such as silicide materials. Examples of such low-expansion materials include ceramic materials, such as those including carbon, e.g., carbides (for example, silicon carbide); those including nitrogen, such as nitrides (for example, silicon nitride); those including oxygen, such as oxides (for example, mullite, titanates, and rare-earth silicates, including rare-earth disilicates); and those including more than one of these elements, such as an oxynitride (for example, SiAlON).

The silicon source material present in first layer 110 may serve at least two functions during service. The silicon source material may provide a source of silicon for transport to the surface 140 of second layer 120 to participate in the formation of protective TGO 150. As such, the silicon activity in the silicon source material is typically set to be higher (in some embodiments, a factor of ten or more higher) than the minimum required to stabilize the membrane material in second layer 120. Additionally, the silicon source material may provide a pathway for silicon, liberated from its source materials within first layer 110, to be transported at a suitable rate from the interior of first layer 110 to second layer 120 so that the silicon transport across second layer 120 can be sustained while silicon is being consumed at surface 140 of second layer. For this reason, the silicon source material is generally situated within first layer 110 in a morphology that provides silicon from first layer 110 with a substantially continuous transport pathway via one or more mechanisms (such as, for instance, solid state diffusion, surface tension, or vacancy hopping) to second layer 120. This morphology is referred to herein as a "substantially interconnected silicon source material," to distinguish it from arrangements that would not provide a sufficiently fast continuous diffusion path for silicon through silicide, such as discrete, unconnected particles of silicide dispersed within a secondary material having unduly low silicon transport properties. However, it is not necessary that the "substantially interconnected" silicon source material be completely interconnected. For example, multiple networks of silicon source material may be present instead of one completely connected network; moreover, for instance, a series of parallel plates of silicon source material disposed to span through the cross section of first layer 110 may also provide the required level of mass transport for silicon, depending on plate spacing and other factors. Indeed, the occurrence of isolated pockets of silicon source material may be acceptable if the intervening secondary material can transport silicon sufficiently quickly. These arrangements, and any others that provide a substantially continuous mass transport pathway through the first layer 110 via silicon source material, fall within the scope of the term "substantially interconnected" for the purposes of this description.

In one embodiment, the silicon source material is present in first layer 110 in a range from about 10 volume percent to about 70 volume percent, and in particular embodiments, the range is from about 20 volume percent to about 40 volume percent. The selection of relative amounts of silicon source material and secondary material present in first layer 110 results from a consideration of competing factors. Mass transport of silicon from first layer 110 to second layer 120 through the silicon source material is more easily facilitated by having higher levels of connectivity among branches of the silicon source material network, which tends to favor relatively high levels of silicon source material content, depending on the morphology of the materials disposed within the layer 110. On the other hand, if the amount of silicon source material in first layer 110 is too high, and the silicon source material has a comparatively high thermal expansion coefficient relative to the substrate 101, the effective thermal expansion coefficient of first layer 110 may exceed levels desirable to mitigate thermal stress. The use of a secondary material having a comparatively low thermal expansion coefficient, such as silicon nitride, may allow for the use of a higher content of a comparatively high-expansion-coefficient silicon source material than would the use of a secondary material having a higher thermal expansion coefficient. Finally, where the silicon source material may melt during service, the amount of silicon source material should be kept below a level where the presence of liquid material may unduly degrade the coating properties.

In a particular embodiment, the materials and amounts selected for first layer 110 are such that the first layer 110 has an effective coefficient of thermal expansion below about 6 parts per million per degree Celsius, such as, for example, about 4 parts per million per degree Celsius to about 5 parts per million per degree Celsius; such a value is desirable for maintaining thermal stresses at practical levels on CMC substrates containing silicon carbide, for example. Where the CMC substrate includes substantial amounts of silicon nitride, the desirable upper limit for the effective coefficient of first layer 110 may be even lower than this, because silicon nitride has a lower thermal expansion coefficient than silicon carbide.

As noted above, the silicon source material is selected to provide a ready source of silicon to sustain the TGO formation reaction at surface 140 of second layer 120 without undue consumption of second layer 120 itself. Elemental silicon, silicides, and mixtures of these two are non-limiting examples of silicon source materials. The silicon source material may be a single phase, or, in some embodiments, may be more than one phase, such as, for instance, where silicon source material includes molybdenum disilicide and lower silicide $Mo_5Si_3$. In one embodiment, the silicon source material includes elemental silicon, sometimes referred to in the art as "silicon metal." In certain embodiments, in addition to the elemental silicon, silicide, or other material, the silicon source material includes a dopant. The dopant may be selected based in part on its ability to diffuse to the TGO formation site at surface 140 of second layer 120 and suppress crystallization of the TGO, the advantages of which are described in more detail herein, below. Examples of suitable dopants include boron and aluminum. The dopant is generally present in the silicon source material in a concentration sufficient to provide sufficient dopant activity at surface 140 to suppress TGO crystallization; in one embodiment, the dopant is present within first layer 110 at a concentration of in a range from about 0.5 percent by weight to about 5 percent by weight.

In other embodiments, the silicon source material includes a silicide. The selection of silicide materials for use in first layer 110 depends in part on several factors. For example, the silicide should have a high melting temperature and at most minimal reactivity with the secondary material at the high temperatures inherent to service conditions for gas turbine components. The silicide in first layer 110 should also readily transport silicon via solid state diffusion at these high temperatures. Examples of silicides that may be suitable for use in first layer 110 include silicides of molybdenum, tantalum, tungsten, niobium, titanium, and ruthenium, along with silicides that include combinations of one or more of these elements.

Illustrative examples of silicide types that may be included in first layer 110 include disilicide compounds, such as molybdenum disilicide ($MoSi_2$), lower silicide compounds (that is, silicides such as $Mo_5Si_3$ that have lower silicon content than disilicides), and combinations of disilicide and lower silicide. Disilicides, being higher in silicon content level than lower silicides, may provide a ready source for silicon through decomposing to a lower silicide and silicon. Lower silicides, in some cases, may have lower coefficients of thermal expansion than their corresponding disilicides, providing the potential to use thicker layers and/or higher silicide contents in first layer 110 than thermal stress considerations may allow for higher silicides, such as disilicides. In some embodiments, the silicon source material includes a disilicide of one or more metal elements, and a lower silicide of the same one or more metal elements; use of the same family of silicides (that is, different silicides of the same metal element) in such a mixture may provide good chemical stability between the two compounds of the silicon source material. The term "silicon source material" encompasses material present in first layer 110 initially and at any time thereafter, including, for instance, silicide or other silicon-bearing material that forms as a result of chemical changes within first layer 110 that transform one silicide to a different silicide.

Thickness of first layer 110 depends in part upon materials selection for substrate 101, and the silicon source material and secondary material of first layer 110; the thermal expansion properties of these materials contribute to the thermal stress generated within first layer 110. Generally, the higher the mismatch between the effective thermal expansion coefficient of first layer 110 and substrate 101, the thinner the layer that can be accommodated. On the other hand, because silicon is provided from layer 110, the layer thickness affects the total quantity of silicon available for eventual transport; thus, in some cases, the minimum thickness requirements may also depend on the desired lifetime of the article 100. In some embodiments, first layer has a thickness in the range from about 25 micrometers to about 500 micrometers. In certain embodiments, this range is from about 25 micrometers to about 250 micrometers, and in particular embodiments it is from about 25 micrometers to about 100 micrometers.

First layer 110, a layer comprising at least two materials, may be fabricated using techniques available in the art. The fabrication method disposes the secondary material within an interconnected silicon source material to arrive at the structure described above. Where the silicon source material includes elemental silicon, with or without dopant, for instance, the secondary material may be disposed in the form of a powder layer that is then at least partially sintered to create a porous structure. Silicon source material, such as elemental silicon, may be melted, infiltrated into the interconnected pores of the secondary material, then solidified. Where silicide is applied as silicon source material, other methods may be used. For instance, where a comparatively high total silicide content, such as 25 volume percent or higher, can be tolerated, layer 110 may be fabricated by plasma spraying, including, for instance, low pressure plasma spray and liquid injection plasma spray techniques, with expectations of suitable degree of interconnection of the silicide material to provide adequate mass transport of silicon to second layer 120. These techniques may be applied for embodiments applying silicon as silicon source material, as well. Optimizing spray parameters such as particle size distributions and spray environments for silicon source material and secondary material feedstock may provide connectivity at silicon source material levels even lower than 25 percent by volume under some conditions. However, as these levels decrease, plasma spray techniques may not provide desired levels of silicon source material connectivity in first layer 110. Those skilled in the art will understand how to vary such process parameters to avoid, for example, undue oxidation of sensitive feedstock materials such as silicon carbide, silicon, and silicides. Moreover, plasma spraying may not provide an effective means for depositing nitrides, as silicon nitride, for instance generally decomposes before it melts, unless special measures can be taken to mitigate this condition.

As an alternative to plasma spray techniques, vapor deposition techniques, combined with masking, may be applied to ensure adequate connectivity for the silicon source material. For instance, chemical vapor deposition (CVD), or a physical vapor deposition (PVD) method such as sputtering, may be applied to deposit secondary material, such as silicon carbide or silicon nitride or other suitable material, onto substrate 101. The deposition may be performed through a mask that creates a pattern having regions where secondary material is deposited, with adjacent spaces between regions, such as a grid pattern or a series of parallel lines. These spaces may then be filled with elemental silicon or silicide, again using a CVD or PVD process. Depending on the desired thickness and/or volume of material being deposited, a mask may be applied in this step as well, to allow selective deposition of silicon source material within the spaces. Second layer 120 may then be applied over the finished first layer 110.

Second layer 120 includes a membrane material, and this membrane material is disposed in mass transfer communication with the silicon source material (i.e., the silicide material found in first layer 110). "Mass transfer communication" as used herein means that the materials are situated to allow mass transfer of silicon from the silicon source material into the membrane material, as through any one or more various mechanisms such as solid-state diffusion, liquid surface tension, vacancy hopping, and the like. Typically, this means the materials are disposed in physical contact with one another, but mass transfer communication may also be maintained through an intervening layer of material, provided that intervening layer does not have a substantially lower mass transfer rate for silicon than the silicon source material and the membrane material. The term "membrane material" encompasses material present in second layer 120 initially and at any time thereafter, including material that forms as a result of chemical changes within second layer 120 that transform one material to a different material. Second layer 120 includes at least about 80% by volume membrane material, and in particular embodiments at least about 95% by volume membrane material. In certain embodiments, second layer 120 consists essentially of the membrane material, meaning that second layer 120 includes membrane material and no other material that significantly alters the ability of second layer 120 to perform the functions described herein.

The membrane material performs at least two functions. First, it isolates the secondary material of first layer 110 from oxidative species diffusing from the service environment, which prevents undue and potentially damaging oxidation of the secondary material, such as silicon nitride or silicon carbide. These materials generate gas by-products such as carbon monoxide and/or nitrogen upon reaction with oxygen, and these gases can build up to sufficient pressure over time to cause spalling of overlying coatings such as top layer 130. It should be noted that previous proposed coatings that purport to use layers including a mixture of a silicide or silicon with a second, low-thermal-expansion phase do not describe the use of anything akin to second layer 120 described herein, the absence of which would leave these proposed systems vulnerable to environmental degradation and substantially reduced effectiveness. Second, membrane material in second layer 120 provides a pathway for silicon and any other desirable species, such as TGO crystallinity inhibitors, to diffuse to surface 140, whereupon the diffused species are available to participate in the formation of the protective silica TGO 150. Also, depending on the specific material used, the membrane material may also serve as a source for silicon to feed the TGO formation reaction; as a non-limiting example, where the membrane material and the silicon source material are identical disilicides, the membrane material will convert to a lower silicide and supply silicon to the TGO reaction until all of the disilicide of the second layer 120 is converted to lower silicide. As explained in more detail, below, proper material selection may provide a remarkable ability for second layer 120 to serve as a "membrane" across which silicon and, potentially, other reactive species diffuse to the surface 140 for TGO formation, without the membrane itself being structurally consumed.

The material(s) selected for the membrane material desirably is chemically stable at temperatures in the relevant use range for article 100, such as temperatures of 1200 degrees Celsius or greater for the case of gas turbine components. Moreover, at such temperatures it is desirable that the membrane material not substantially react with the secondary material of first layer 110. In some embodiments, the membrane material includes a silicide, such as a silicide of at least one metal element, such as molybdenum, tantalum, tungsten, niobium, titanium, ruthenium, or a combination including one or more of the aforementioned elements. Generally, the diffusion rate of silicon through such a silicide is desirably higher at service temperatures (such as temperatures higher than 1200 degrees Celsius) than the diffusion rate of the constituent metal element(s) through the silicide at the same temperature, to promote desirable silicon oxidation at surface 140 over potentially less desirable metal oxide formation.

Moreover, the membrane material is typically selected such that, again at relevant service temperatures, silicon diffusion through the material exceeds the rate at which oxygen diffuses through silica; in some cases this difference may be by a factor of ten or more, and in certain instances it may differ by more than a factor of 100. This comparatively rapid rate of silicon transport through the membrane material enables a remarkable ability to generate the protective TGO 150 without substantially consuming (that is, completely oxidizing) the membrane material, because silicon from first layer 110 can move quickly to interface 140 to feed the TGO formation reaction before oxygen penetrates through the TGO to substantially attack second layer 120. First layer 110 thus serves as a "reservoir" of silicon that travels from first layer 110 through the membrane material in second layer 120 to arrive at surface 140 and there participate in the formation of TGO 150. Because second layer 120 is not substantially consumed in service, it may be disposed as a relatively thin layer, and so may not generate undesirable levels of thermal stress even where its membrane material has a rather substantial mismatch of coefficient of thermal expansion relative to that of substrate 101.

Silicides are one class of material suitable for inclusion in the membrane material. For example, the membrane material may include one silicide constituent, or it may include two or more silicide constituents. In one embodiment, the membrane material includes a disilicide, such as a disilicide of molybdenum, tantalum, tungsten, niobium, titanium, ruthenium, or a combination including one or more of these elements. As noted previously, a disilicide may advantageously provide a source for silicon to be used in formation of the TGO 150, but at the cost of a higher level of thermal expansion coefficient mismatch with substrate 101.

In some embodiments, the membrane material includes a silicide having lower silicon content than a disilicide, referred to herein as a "lower silicide," such as a lower silicide that exists in chemical equilibrium with a given disilicide, i.e., the next silicide to the disilicide in a descending order list of stable silicides for a given silicon-metal element equilibrium system. In particular embodiments, the membrane material consists essentially of one or more of such lower silicides. Examples of such lower silicides include, without limitation, TiSi, RuSi, and $Z_5Si_3$ where Z is, for instance, molybdenum, niobium, tantalum, and/or tungsten. As noted previously, lower silicides tend to have smaller coefficients of thermal expansion than their corresponding disilicides (meaning, disilicides of the same metal element), providing a better thermal expansion match with low-expansion CMC substrates such as CMC's containing silicon carbide or silicon nitride.

The use of lower-expansion materials may allow the use of a thicker second layer 120, which may provide a more robust coating that better withstands mechanisms operative at high temperature, such as Oswaldt ripening, that may damage thinner coatings over time. In some embodiments, second layer 120 has a thickness up to about 250 micrometers. Generally, the thickness of the second layer 120 is designed to be little or no thicker than is needed to withstand these operative damage mechanisms for a desired lifetime. Accordingly, in certain embodiments, this thickness is in a range from about 1 micrometer to about 50 micrometers. Where a thinner layer is desired, second layer may be in a range from about 1 micrometer to about 25 micrometers, and in particular embodiments the range is from about 1 micrometer to about 5 micrometers.

In some embodiments, the membrane material includes a lower silicide, which may allow for a thicker second layer 120 to be applied than if a higher-thermal-expansion-coefficient silicide, such as a disilicide, were used. In particular embodiments of this type, the metal element components of silicon source material and the membrane material are identical, that is, the silicon source material and the membrane material are compounds of the same metal element, which may mitigate thermodynamic instability issues within the layers.

Other materials may be applied as alternatives to, or in addition to, silicides in the membrane material. Silicon carbide is one example. The diffusivity of silicon in polycrystalline silicon carbide at 1400 degrees Celsius using diffusion data reported in the literature ranges from on the order of $10^{-21}$ cm$^2$/sec (from Ghoshtagore et al., *Physical Review*, 143[2] (1966), pp. 623-626) to about $10^{-17}$ cm$^2$/sec (from Gruber et al., *Thin Solid Films*, 518 (2009), pp. 396-398) up to about 8 orders of magnitude lower than the diffusivity of oxygen in silica at that temperature (reported by Williams in 1965 to be on the order of $10^{-13}$ cm$^2$/sec), which implies that, in general, silicon carbide is not a good candidate for membrane material. However, using data derived from literature reports on carburization of silicon to form silicon carbide (see, e.g., Friederich and Coble, *Comm Am. Cer. Soc.* 1983, C141; and Kato and Okabe, *J. Am. Cer Soc.*, 63(1980), 236), the present inventors have calculated an effective diffusivity of silicon in the silicon carbide in these tests (formed by heat treating a pure silicon fiber at temperatures ranging from 1390 degrees Celsius to about 1450 degrees Celsius in a furnace atmosphere containing methane) to be on the order of $10^{-11}$ cm$^2$/sec to $10^{-10}$ cm$^2$/sec, which is substantially higher than oxygen diffusivity in silica. This result suggests that silicon carbide having the proper diffusion behavior (whether derived through processing, structure, composition, etc.) may be acceptable for use as a membrane material. In one embodiment, the membrane material comprises silicon carbide formed by carburizing silicon or other silicon-bearing material, such as a two-phase mixture of silicon and silicon carbide, in a high temperature, carbon-bearing environment; those skilled in the art will understand the processing conditions, such as temperature, time, and carbon activity of the ambient processing environment, suitable to produce silicon carbide. Silicon carbide, when provided in a form possessing this remarkably high effective diffusivity for silicon, holds several advantages for use as a membrane material, including, for instance, high chemical and thermal expansion compatibility with silicon-carbide-bearing CMC substrates. In particular, the negligible thermal expansion coefficient mismatch between the membrane material and the substrate may allow for the use of a comparatively thick, more robust second layer 120 than would be advisable when using a membrane material with a higher level of mismatch.

Other materials that may possess the combination of high temperature capability and ability to transport silicon sufficiently rapidly as noted above include silicon boride and various carbosilicides. Of course, selection of any given combination of membrane material and materials for first layer 110 needs to take chemical stability and thermal stress effects into account. One skilled in the art will be familiar with the testing needed to determine the efficacy of the various possible materials combinations under particular conditions.

Second layer 120 may be deposited over first layer using any suitable coating technique, such as by plasma spraying, CVD, and/or PVD techniques.

Figure 2:
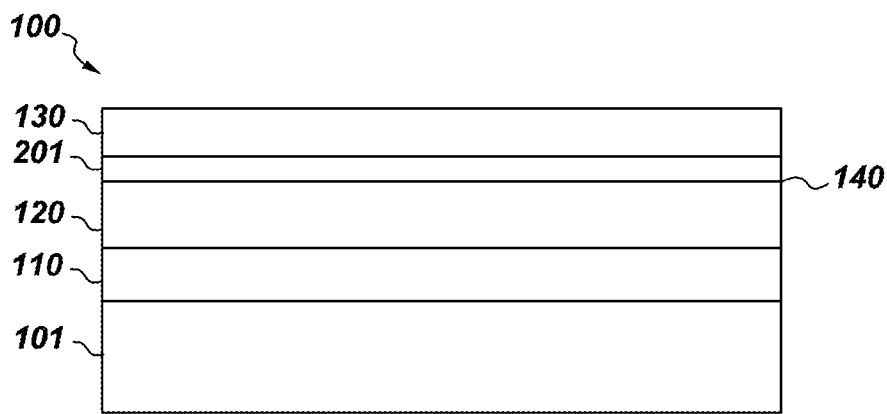
FIG. 2 is a cross-section illustration of another embodiment.

Other coating layers may be present in article 100. As shown in FIG. 2, in some embodiments, an additional layer 201, comprising silica, is disposed between second layer 120 and top layer 130. This silica-bearing layer 201 may help to avoid issues with transient oxidation processes that could occur early in the service life of article. For instance, the first oxide to form on a metal silicide, if present in second layer 120, will likely include silica and oxide of the particular metal element(s) present in the silicide. At comparatively low temperatures, such as about 800 C, the growth rate of silica is slow, allowing the formation of metal oxide to significantly compete with silica formation. This may result in rapid oxidation and even pesting, depending on the metal element(s) involved and the temperature. The presence of layer 201 may inhibit the formation of metal oxide in cases where, as described previously, the membrane material is selected for its ability to facilitate rapid silicon diffusion—more rapid than oxygen transport rate through silica, and more rapid than metal element diffusion through the silicide. This promotes preferential transport of silicon to the reaction area and mitigates the degree to which metal species are available to participate in the oxidation reaction. The thickness of additional layer 201 need not be high; a continuous layer may be sufficient to achieve its described function. In some embodiments, the additional layer 201 has a thickness in the range from about 1 micrometer to about 10 micrometers, well within the capability of coating processes such as chemical vapor deposition (CVD), physical vapor deposition (PVD), and other suitable coating methods.

Another example of an optional layer present in article 100 addresses the issue of crystallization of the TGO (150, FIG. 1), which can become a problem with prolonged exposure to temperatures above about 1200 degrees Celsius.

Silica-based TGO typically forms in an amorphous form, but crystallized silica (cristobalite) goes through phase changes on cooling, and the crystallographic changes associated with the phase changes can induce cracking and spallation of the silica film, accelerating the oxidation of silicon compounds and degrading adhesion of outer coating layers to the underlying substrate. As described in commonly owned Patent Cooperative Treaty Patent Application PCT/US15/045593, filed 18 Aug. 2015, providing a source of aluminum to the TGO may dope the TGO with aluminum, promoting an aluminosilicate composition in the TGO and stabilizing an amorphous structure that thus mitigates premature failures due to the described phase transformation. Also, as noted previously, a quantity of boron present in the TGO may also inhibit this deleterious crystallization of the silica film, and thus providing a source of boron to the TGO may be advantageous in some embodiments.

Figure 3:
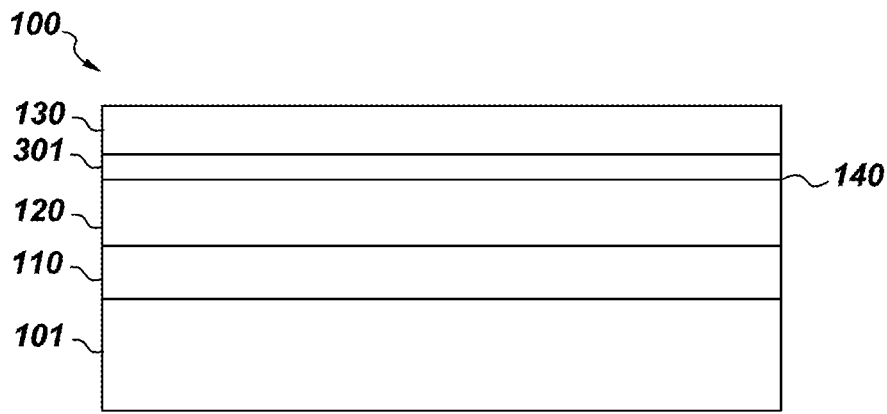
FIG. 3 is a cross-section illustration of another embodiment of the present invention.

Doping second layer 120 with aluminum or boron may be one means of promoting uptake of these elements into the TGO, though this may not be efficient because the membrane material, present in second layer 120, is not substantially consumed by TGO formation. In one embodiment, as shown in FIG. 3, an intermediate layer 301 is disposed between second layer 120 and top layer 130. Intermediate layer 301 includes aluminum, boron, or a combination of these dopants, and in service provides a source of dopant that may be taken up within the TGO to stabilize its amorphous structure. In one embodiment, intermediate layer 301 includes an aluminosilicate glass, or a borosilicate glass. In another embodiment, layer 301 includes mullite, and in particular embodiments consists essentially of mullite. Mullite has been observed to promote aluminosilicate glass formation in TGO formation over silicon-based bond coats. Other aluminum-bearing materials such as yttrium-aluminum garnet (YAG) may be suitable as alternatives to mullite in intermediate layer 301, depending on specific materials selection for top layer 130 and other components of article 100. Plasma spray techniques are suitable for deposition of materials such as mullite and YAG and are used for such materials extensively in the art. Other coating techniques, such as slurry-based techniques or vapor deposition techniques, may be applied as well.

Combinations of the various functionalities described above for layers 201, 301 are also encompassed within the scope of this description. For instance, in some embodiments, layer 201 (FIG. 2), comprising silica, further includes one or more dopants that serve to inhibit crystallization within TGO 150 (FIG. 1). As noted previously, aluminum is one example of such a dopant. Other elements, such as boron, alkaline metals such as sodium and potassium, and alkaline earth metals such as calcium, magnesium, and strontium, for instance, may be included additionally with, or alternatively to, aluminum. In other embodiments, layer 301 includes dopants such as these described here in addition to the aluminum source included in this layer 301. Regardless of where the dopant is included, whether in layer 201 or layer 301 (or both of these, if both are present), the amounts of these dopants selected for use in layer 201 generally are selected with consideration given to a balance of properties. For instance, dopants may adversely affect properties such as melting point, rate of oxygen transport, and/or TGO viscosity, and so each dopant may have an upper limit of acceptable concentration to avoid having deleterious effects outweigh the advantageous effect on silica crystallization.

Top layer 130 may include various sub-layers. Use of the term "top layer" does not signify that layer 130 must be the outermost layer of article 100, although in some embodiments top layer is outermost. Top layer 130, typically including some form of oxide material, may be disposed to provide thermal insulation (a thermal barrier coating), environmental protection (an environmental barrier coating), or a combination of these functions. The selection of a suitable material will depend on the type of environment the article is to be exposed to, the composition of the underlying coatings and substrate, the cost of processing, and other factors. The top layer 130 may be a ceramic material including, but not limited to, a silicate (such as an aluminosilicate or rare earth silicate), and yttria-stabilized zirconia. Top layer 130 may include a rare earth monosilicate and/or rare earth disilicate. Top layer 130 may be a dual-layer coating, with an outer layer of rare earth monosilicate and an inner layer of rare earth disilicate. The rare earth elements associated with these monosilicate and disilicate materials include, for example, one or more of yttrium, ytterbium, lutetium, and scandium. In one embodiment, the outer layer of top layer 130 includes yttrium monosilicate and the inner layer of top layer 130 includes a rare earth disilicate (such as yttrium disilicate, for example).

Any of various techniques may be used for fabrication of top layer 130 and will be well known to practitioners in the art. Plasma spray, sol-gel, electrophoretic, and slurry-based deposition techniques are non-limiting examples of methods commonly used to apply coatings of this type.

EXAMPLES

The following examples are presented to further illustrate non-limiting embodiments of the present invention.

One illustrative example of an embodiment of the present invention is an article 100 that includes a substrate 101 comprising a ceramic matrix composite, such as a CMC including silicon carbide. A first layer 110 is disposed over substrate 101, and this layer 110 includes a silicon source material and a secondary material. The silicon source material includes elemental silicon, such as, for instance, silicon doped with boron, aluminum, or other TGO crystallinity inhibitor, and is disposed to have a substantially interconnected morphology; the secondary material includes an oxide that is chemically stable with respect to the silicon source material, such as a rare earth silicate, mullite, or combinations thereof. The volume fraction of silicon in first layer 110 is in the range from about 10 percent to about 50 percent, such as about 20 percent, for instance, with the balance of first layer 110 including, and in some embodiments, consisting essentially of, the secondary material. A second layer 120 is disposed over the first layer 110. The second layer 120 comprises a membrane material. This membrane material includes one or more materials such as a silicide, silicon carbide (that is, a grade of silicon carbide possessing high silicon effective diffusivity as noted previously), silicon boride, or a carbosilicide, and is disposed in mass transfer communication with the silicon source material. A top layer 130, comprising an oxide such as a mono- or di-silicate or yttria-stabilized zirconia, for example, is disposed over second layer 120.

Another illustrative example of an embodiment of the present invention is an article 100 that includes a substrate 101 comprising a ceramic matrix composite, such as a CMC including silicon carbide. A first layer 110 is disposed over substrate 101, and this layer 110 includes a silicon source material and a secondary material. The silicon source material includes a silicide, and is disposed to have an interconnected morphology. The secondary material includes one or more suitable materials, such as silicon nitride, silicon carbide, or an oxide such as a rare earth oxide or mullite. The volume fraction of silicon source material in the first layer 110 is in the range from about 10 percent to about 50 percent, such as about 30 percent, for instance. A second layer 120 is disposed over the first layer 110. The second layer 120 comprises a membrane material. This membrane material is disposed in mass transfer communication with the silicon source material. In this example, the membrane material includes silicon carbide having comparatively high silicon effective diffusivity, as noted above for silicon carbide formed by carburizing. The effective silicon diffusivity in the membrane at 1400 degrees Celsius exceeds that of oxygen in silica at this temperature. A top layer 130, comprising an oxide such as a mono- or di-silicate or yttria-stabilized zirconia, for example, is disposed over second layer 120.

While only certain features of the invention have been illustrated and described herein, many modifications and changes will occur to those skilled in the art. It is, therefore, to be understood that the appended illustrative embodiments are intended to cover all such modifications and changes as fall within the true spirit of the invention.

What is claimed is:

1. An article, comprising:
   a substrate comprising a ceramic matrix composite;
   a first layer disposed over the substrate, the first layer comprising a substantially interconnected silicon source material comprising elemental silicon, and a secondary material, wherein the elemental silicon is present in the first layer in a range from about 10% by volume to about 70% by volume; and
   a second layer disposed over the first layer, the second layer comprising a membrane material in mass transfer communication with the silicon source material, wherein the membrane material comprises a silicide, silicon carbide, silicon boride, a carbosilicide, or a combination comprising any one or more of these, wherein the second layer includes at least 80% by volume of the membrane material;
   wherein, for a given temperature above about 1200 degrees Celsius, silicon diffusion through the membrane material exceeds the rate at which oxygen diffuses through silica.

2. The article of claim 1, wherein the membrane material comprises a lower silicide.

3. The article of claim 1, wherein the membrane material comprises a silicide of molybdenum, tantalum, tungsten, niobium, titanium, ruthenium, or a combination including one or more of the aforementioned elements.

4. The article of claim 1, wherein the second layer has a thickness in a range from about 1 micrometer to about 50 micrometers.

5. The article of claim 1, wherein the secondary material of the first layer has a coefficient of thermal expansion less than or equal to that of silicon carbide.

6. The article of claim 1, wherein the secondary material comprises a ceramic material comprising carbon, nitrogen, oxygen, or a combination of these.

7. The article of claim 1, wherein the secondary material comprises silicon carbide, silicon nitride, a metal oxide, or a combination comprising one or both of these.

8. The article of claim 1, wherein the secondary material comprises a rare-earth disilicate, mullite, or a combination comprising one or more of these.

9. The article of claim 1, wherein the first layer has an effective coefficient of thermal expansion below about 6 parts per million per degree Celsius.

10. The article of claim 1, wherein the silicon source material further comprises a dopant.

11. The article of claim 10, wherein the dopant comprises boron or aluminum.

12. The article of claim 10, wherein the dopant is present within the first layer at a concentration in a range of 0.5 percent by weight to 5 percent by weight.

13. The article of claim 1, further comprising a top layer disposed over the second layer, the top layer comprising an oxide.

14. The article of claim 13, wherein the oxide comprises a silicate, an aluminosilicate, yttria-stabilized zirconia, or a combination including any of the aforementioned.

15. The article of claim 13, wherein an intermediate layer is disposed between the second layer and the top layer.

16. The article of claim 15, wherein the intermediate layer includes aluminum, boron or a combination thereof.

17. The article of claim 1, wherein the article is a combustion liner for a gas turbine assembly, a transition piece for a gas turbine assembly, a shroud for a gas turbine assembly, a vane for a gas turbine assembly, or a blade for a gas turbine assembly.

18. An article comprising:
    a substrate comprising a ceramic matrix composite;
    a first layer disposed over the substrate, the first layer comprising a substantially interconnected silicon source material phase and a secondary material, wherein the silicon source material phase comprises elemental silicon, wherein the elemental silicon is present in the first layer in a range from about 10% by volume to about 70% by volume;
    a second layer disposed over the first layer, the second layer comprising a membrane material in mass transfer communication with the silicon source material, wherein the membrane material comprises silicon carbide, silicon boride, a carbosilicide, or a combination comprising one or more of these, wherein the second layer includes at least 80% by volume of the membrane material; and
    a top layer disposed over the second layer, the top layer comprising an oxide;
    wherein, for a given temperature above about 1200 degrees Celsius, silicon diffusion through the membrane material exceeds the rate at which oxygen diffuses through silica.

19. The article of claim 18, wherein the second layer has a thickness in a range from about 1 micrometer to about 50 micrometers.

20. The article of claim 18, wherein the secondary material of the first layer has a coefficient of thermal expansion less than or equal to that of silicon carbide.

21. The article of claim 18, wherein the secondary material comprises a ceramic material comprising carbon, nitrogen, oxygen, or a combination of these.

22. The article of claim 18, wherein the secondary material comprises silicon carbide, silicon nitride, or a combination comprising one or both of these.

23. The article of claim 18, wherein the secondary material comprises a rare-earth disilicate, mullite, or a combination comprising one or more of these.

24. The article of claim 18, wherein the first layer has an effective coefficient of thermal expansion below about 6 parts per million per degree Celsius.

25. The article of claim 18, wherein the silicon source material phase further comprises doped elemental silicon, a silicide, or a combination comprising any one or more of these.

26. The article of claim 25, wherein the silicide is a silicide of molybdenum, tantalum, tungsten, niobium, titanium, or ruthenium, or a combination comprising any one or more of these.

27. The article of claim 25, wherein the silicide is a disilicide compound, a lower silicide compound, or a combination of disilicide compounds and lower silicide compounds.

28. The article of claim 18, wherein the oxide comprises a silicate, an aluminosilicate, yttria-stabilized zirconia, or a combination including any of the aforementioned.

29. The article of claim 18, wherein the silicon source material phase further comprises a dopant.

30. The article of claim 29, wherein the dopant is a doped elemental silicon comprising boron or aluminum.

31. The article of claim 29, wherein the dopant is present within the first layer at a concentration in a range of 0.5 percent by weight to 5 percent by weight.

32. The article of claim 18, wherein an intermediate layer is disposed between the second layer and the top layer.

33. The article of claim 32, wherein the intermediate layer includes aluminum, boron or a combination thereof.

34. The article of claim 18, wherein the article is a combustion liner for a gas turbine assembly, a transition piece for a gas turbine assembly, a shroud for a gas turbine assembly, a van for gas turbine assembly, or a blade for a gas turbine assembly.

35. The article of claim 1, wherein the elemental silicon is present in the first layer in a range from about 20% by volume to about 40% by volume, and wherein the second layer includes at least 95% by volume of the membrane material.

* * * * *